United States Patent [19]

Gray

[11] Patent Number: 4,794,248

[45] Date of Patent: Dec. 27, 1988

[54] DETECTION DEVICE HAVING ENERGY TRANSMITTERS LOCATED AT VERTICALLY SPACED APART POINTS ALONG MOVABLE DOORS

[75] Inventor: John E. Gray, Milperra, Australia

[73] Assignee: Otis Elevator Company, Farmington, Conn.

[21] Appl. No.: 148,203

[22] Filed: Jan. 29, 1988

Related U.S. Application Data

[63] Continuation of Ser. No. 755,966, Jul. 16, 1985, abandoned.

[51] Int. Cl.⁴ .......................... G01V 9/04; H01J 40/14
[52] U.S. Cl. ........................................ 250/221; 187/56
[58] Field of Search ............. 250/221, 222.1; 340/21, 340/19 R, 545, 555, 557, 556; 49/25–28; 187/51, 56

[56] References Cited

U.S. PATENT DOCUMENTS 3,746,863 7/1973 Pronovost ..................... 250/221 X
3,805,064 4/1974 Kornylak ........................ 250/221
4,247,767 2/1981 O'Brien et al. .................. 250/221

Primary Examiner—David C. Nelms
Assistant Examiner—William L. Oen

[57] ABSTRACT

In the entranceway between an elevator car and a floor are two oppositely sliding doors. The approach of these doors is controlled by a detection system that senses the presence of objects between the doors. This system includes, on each door, a plurality of emitters which are vertically spaced apart the door edge, for radiating noncollimated light towards the edge of the other door. At the top and bottom portions of each door edge there is a sensor which can receive the radiation from the emitters on the other door edge. The emitters on each door edge are sequentially turned on and the sensors on the opposite door edge provide a corresponding signal as they are turned on, unless an obstruction is in the way, causing the detection system to generate a signal that thus indicates that an object is between the doors.

2 Claims, 4 Drawing Sheets

DETECTION DEVICE HAVING ENERGY TRANSMITTERS LOCATED AT VERTICALLY SPACED APART POINTS ALONG MOVABLE DOORS

This application is a continuation of Ser. No. 06/755,966, filed on July 16, 1985, now abandoned.

DESCRIPTION

1. Technical Field

This invention relates to equipment for sensing that an object is in a defined space, in particular, a doorway, such as an elevator car doorway.

2. Background Art

In elevators it is common to use one or more sliding doors and to open and close them automatically. Consequently, often equipment is used that detects the presence of an obstructing body, namely a passenger, between the doors just prior to and during their automatic closure to control equipment to prevent the doors from closing more and, preferably, reopen them.

One such device puts a light beam in a path transvere the door opening and uses a sensor to detect an interruption of the light beam, which would occur if an obstruction is between the door. Then, upon sensing an interruption, the sensor issues a signal to the door control mechanism to alter the normal operation of the doors, preferably reopen them.

In usual practice that device has an array of light sources disposed on one side of the doorway, producing parallel light beams at different levels, and a corresponding array of photo-sensitive detectors arranged on the other door, for sensing those light beams, thus creating a system which can sense objects of different heights between the door. For maximum sensitivity, the light beams are generally collimated by a lens to ensure that each sensor is responsive to one light source.

This arrangement, although generally satisfactory, has a disadvantage: because the light beams are spaced apart from each other, objects between the beams are not sensed. For instance, an arm extended horizontally may fail to be sensed.

The sensitivity could, of course, be improved, for instance, by spacing the parallel beams more closely together, in effect, providing substantially contiguous light beams. But, that would be costly to implement, and, to maintain sensitivity, the light beams would need to be highly collimated to prevent stray light from one sensor from reaching an adjacent—the wrong—sensor, as that could blind the sensor. The large number of photodetectors and their optical systems for beam collimation that would be needed would, of course, add significantly to cost. Mirrors may be used to extend the path length of a light beam from its source so that the beam traverses the door opening a number of times prior to striking a photodetector. But, while that reduces the number of detectors required, it also reduces the intensity of the light beam reaching each detector; thus, in the end, increasing the demands on beam optics.

Consequently, the simple array of spaced apart parallel beams has been widely accepted as being the best compromise of safety, efficiency and cost.

DISCLOSURE OF THE INVENTION

According to the invention, the area in which a sliding door moves is monitored for the presence of objects, as the door closes, through the use of energy emitters and detectors located along the vertical perimeter of the area. The emitters are sequentially operated, and if the energy path between the emitter and the detector is broken, a signal is provided to alter door operation. The emitters and detectors are arranged so that the sliding door moves is monitored for the presence of objects, as the door closes, through the use of energy emitters and detectors located along the vertical perimeter of the area. As the door closes, the emitters are sequentially operated, and if the energy path between the emitter and the detector is broken, a signal is provided to alter door operation. The emitter and detectors are arranged so that the light paths pass diagonally across the area. As the area gets smaller—as the door closes—the area traversed by each path shifts vertically and the paths compress, which increases the detection resolving power and sensitivity.

According to one aspect of the invention, energy emitters may be located vertically along one edge of the door, and detectors may be located at the top and bottom of the stationary surface opposite the door. Therefore, as the door closes, the path between each energy emitter and detectors shifts vertically. As a result, substantially all of the area is monitored as the door closes.

BEST MODE FOR CARRYING OUT THE INVENTION

Figure 1:
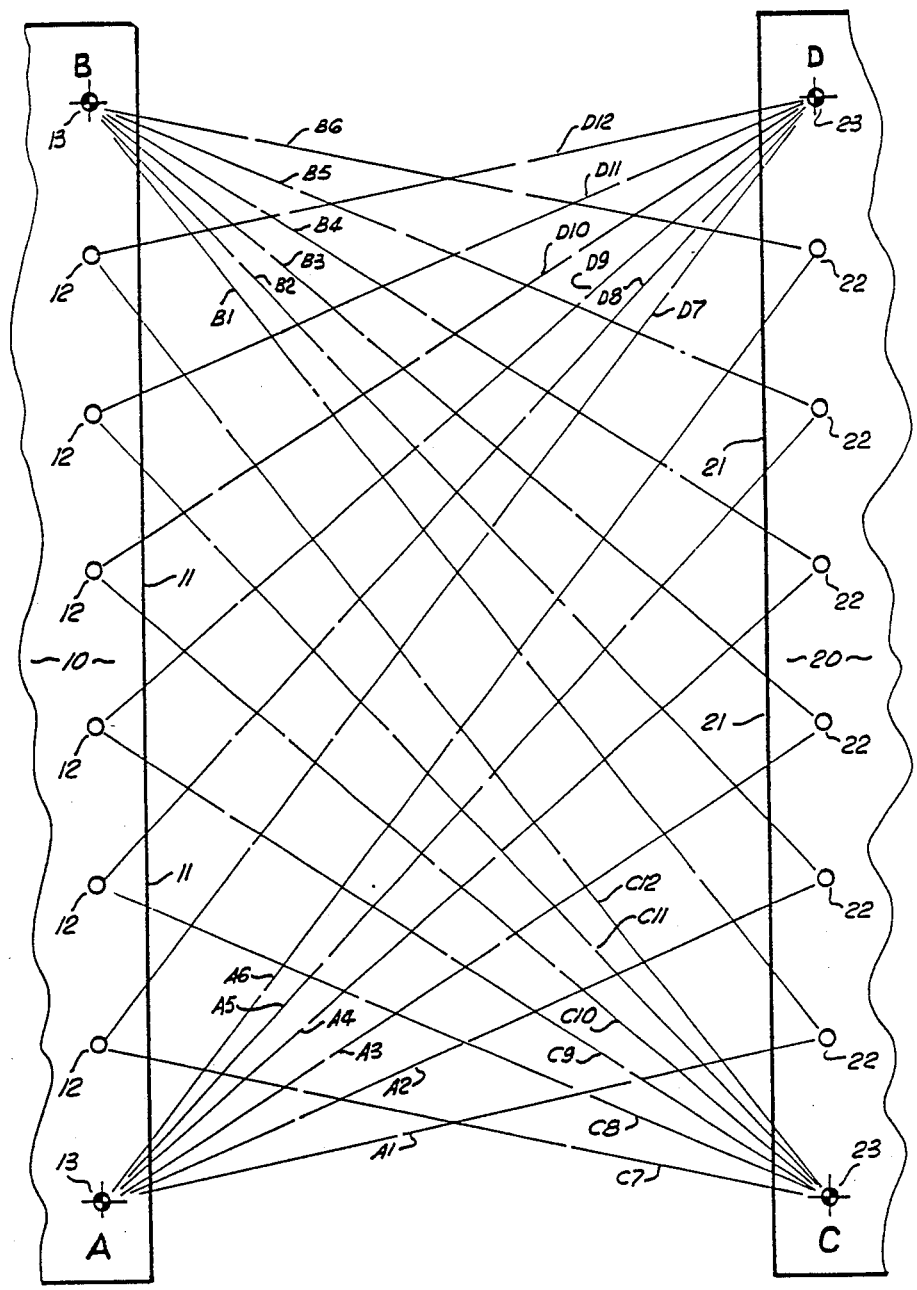
FIG. 1 is a schematic diagram showing an arrangement of emitters and sensors disposed, according to the invention, or adjacent cooperating elevator doors.
Figure 2:
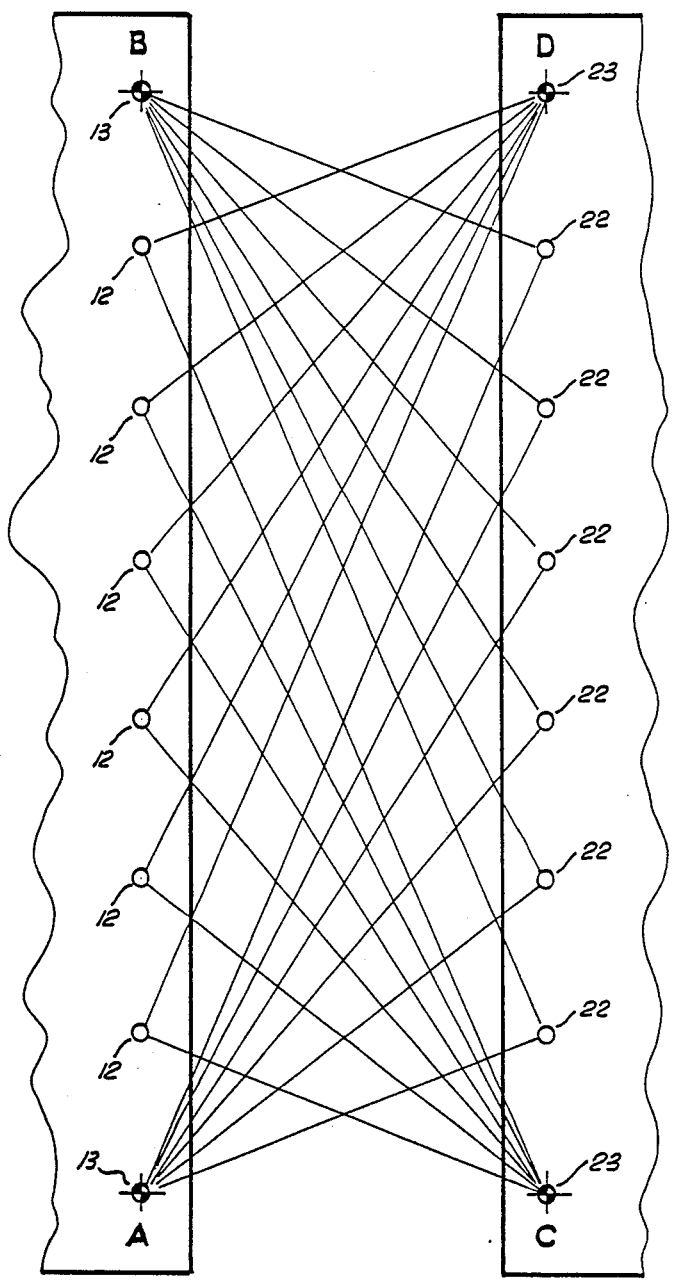
FIG. 2 shows the arrangement of FIG. 1 as the doors approach each other.

In FIGS. 1 and 2 there is a first elevator door 10 and a second elevator door 20. These doors, shown in an open position in FIG. 1, slide to open and close, and, as they close, the closure edge 11 of door 10 touches the closure edge 21 of door 20.

A plurality of elements, made up of emitters 12 and 22 and sensors 13 and 23, define a first "array" and a second "array" on the closure edges 11, 21.

The first array is comprised of the emitters 12 that are spaced apart from each other along the edge 11 and the sensors 13 that are at the top and bottom of the edge 11.

The second array, on the adjacent closure edge 21 (on door 20) is comprised of the remaining emitters 22 and sensors 23, which are on the edge 21.

The emitters may be light bulbs, LED devices or any radiation emitting device; for example, an infrared emitter that is modulated, so that its emitted radiation is distinguishable from background radiation of the surroundings.

Likewise, the sensors may be any device that is sensitive to the radiation of the emitters; yet, adapted to be insensitive to radiation other than from the emitters. Thus, the sensors may be photodiodes, phototransistors or the like, and these may be gated in synchronization with a modulated emitter for improved sensitivity.

The radiation from the emitters is not collimated, unlike related prior techniques that use lights and detectors in matched pairs, where collimation is required for good sensitivity. Consequently, each sensor actually receives radiation in a plurality of paths, each extending between the sensor and one of the emitters, as FIG. 1 shows.

In FIGS. 1 and 2, the plurality of radiation paths that extend between emitters and sensors are shown; each path is distinguished there by an alphabetic index that is indicative of the sensor, and a numeral that is indicative of the emitter at the ends of the path. From FIG. 2 it is apparent that these paths criss-cross, defining a network in space, the gap between the door closure edges 11 and 21, and that the space between these paths is smaller than in the prior art devices.

Figure 6:
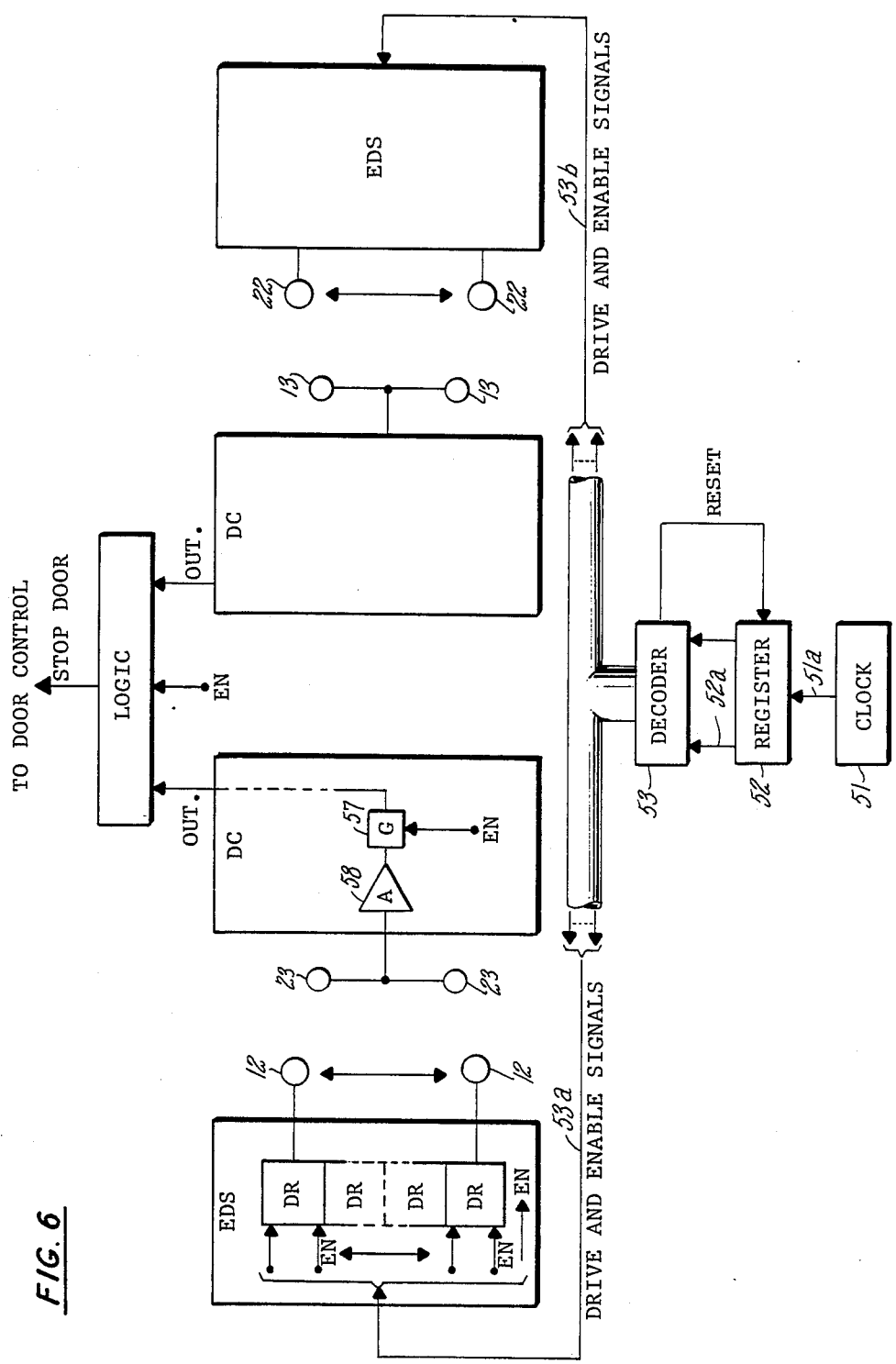
FIG. 6 is a functional block diagram of an electrical control system for controlling operation of the emitters and detectors according to the present invention.

Electronic control circuitry for this purpose is well known. For instance, FIG. 6 shows a circuit that is provided whereby each emitter on opposite door edges is energized to emit radiation in a first sequence, and each sensor is monitored in a second sequence so that one emitter is energized and one sensor is monitored, at any time. For example, each of the emitters 12 is energized in sequence while one of the sensors 23 is monitored; then each of emitters 22 is energized sequentially while one of sensors 13 is monitored. After that, each of emitters 12 are again sequentially energized while the other (the second of the sensors 23) is monitored. Then the emitters of sensors 22 are again sequentially energized while the other (the second sensor 13) is monitored. The exact sequence is not important, although, in a preferred, basic operation, each emitter and a sensor combination that define a radiation path therebetween is respectively energized and monitored repetitively many times per second in some sequence. In FIG. 6, a clock 51 controls a shift register 52, which counts the clock pulses, on line 51a, producing a binary output at 52a. The binary output is provided to a decoder 53 which supplies, over the lines 53a, 53b, emitter drive and enable signals to emitter drive systems EDS associated with the emitters 12 and 22. Each EDS contains a driver unit DR for powering each emitter that is operated by an enable signal EN and activation signal AS. The EN signal, which is supplied to a detector control DC, also activates a gate 57 which is connected to the output of an amplifier 58, which receives the detector (e.g., 23) output. As the register counts up, each emitter 12 (on one door) is activated, along with the detector 23 (on the opposite door). Then the emitters 23 on the other door and the opposed detector 13 are activated in the same sequential manner. Once all the emitters are activated, the register is reset to zero by a RESET signal and the process then repeats. The repetitive process takes place as many times as the doors close. A destruction in the path between an emitter and detector will produce an output from the gate 57. The viewing angle of each detector relative to an emitter changes as the door edges move closer, and, as a result, the entire field between the moving doors is viewed. The output OUT from each DC unit is supplied to a LOGIC unit. It receives the EN signal and produces a DOOR CONTROL signal, to stop or reverse the door, if there is coincidence between an OUT signal and the EN signal, which indicates the presence of an object in the path of the doors.

Each path is thus monitored for obstruction once in an overall sequence, and, because the sensor does not receive radiation from other emitters and no other emitter is activated, the sensor is highly sensitive to the obstruction. For maximum sensitivity, the sensitivity of the sensors may be adjusted in synchronization with the energization of the emitters, since each path involves a unique combination of sensor and emitter. For example, the gain of an amplifier receiving a signal from sensor 13 may be higher when one emitter 22 is activating path C7 than when another emitter 22 is activating path A6.

With reference to FIG. 2, it shows the embodiment of FIG. 1, but when the doors are in a more nearly closed positon, it will be seen there that the flux density in space of the radiation paths increases as the doors approach each other.

Figure 3:
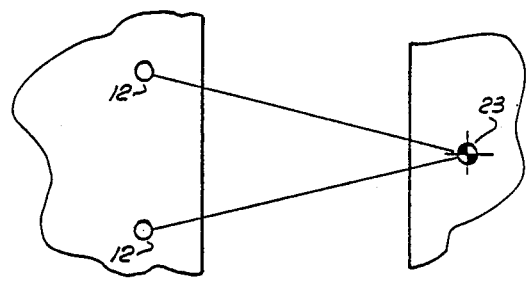
FIGS. 3, 4 and 5 show other arrangements of sensors and emitters according to the invention.
Figure 4:
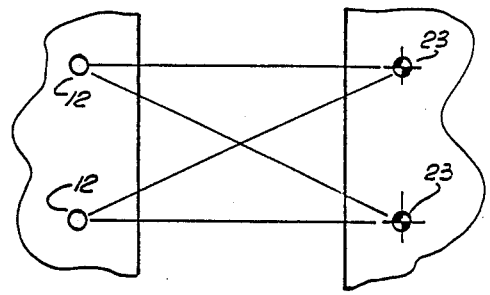
Figure 5:
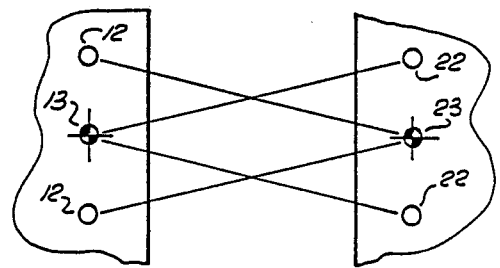

In its simplest form, the invention includes embodiments such as those shown in FIGS. 3, 4 and 5. Yet, those skilled in the art will recognize that because emitters are available at low cost in comparison with sensors, there are many possible geometric arrangements within the scope of the invention.

It is desirable, to produce a signal, that only one combination of sensor and emitter are active at any time; but, a combination of sensors and emitters may also be selected for simultaneous activity. For example, at the same time that an emitter on one edge and a sensor on the other edge are operative, a sensor on that one edge and an emitter on that other edge may be operative.

The circuits required to construct embodiments according to the invention may use multiplex techniques which are known to those skilled in the art from the foregoing.

Other modifications to the embodiment of the invention that have been described will be obvious to those skilled in the art, yet within the scope of the invention.

I claim:

1. A method for detecting the presence of an object in the path of a closing sliding door, characterized by:
    sequentially activating energy transmitters as the door closes, to transmit energy between vertically spaced apart points along one of the two vertical edges of the area closed by the door to a detector on the second of said edges, an imaginary line between the detector and each transmitter decreasing as the door closes and being at an angle greater than 0 but less than 90 degrees to the direction in which the door slides;
    sensing the transmitted energy with the detector for producing an output signal in response to the energy;
    sensing the output from the detector when the energy is transmitted from each energy transmitter and providing a door stop signal when there is no output from the detector when each energy transmitter is activated.

2. A detection system for detecting the presence of an object in the path of a closing sliding door, characterized by:
    a plurality of energy transmitters located at vertically spaced apart points on one vertical edge of the area into which the door slides to a closed position;
    a second vertical edge on said area that is substantially parallel to said one edge, the distance between said one edge and said second edge decreasing as the door closes;
    an energy detector capable of providing an output signal in response to the energy transmitted by each transmitter, and is located on said second vertical edge at a position at which an imaginary straight line between the detector and each transmitter is at an angle greater than 0 but less than 90 degrees to an imaginary line defining the direction in which the door slides;
    means for activating the transmitters sequentially as the door closes;
    means for providing a door control signal when a transmitter is activated and an output signal is not produced by the detector each energy emitter and energy detector having relative motion towards each other as the door closes.

* * * * *